June 22, 1943.  S. M. BUNN  2,322,342
PLOW ATTACHMENT FOR TRACTORS
Filed May 1, 1941  3 Sheets-Sheet 1
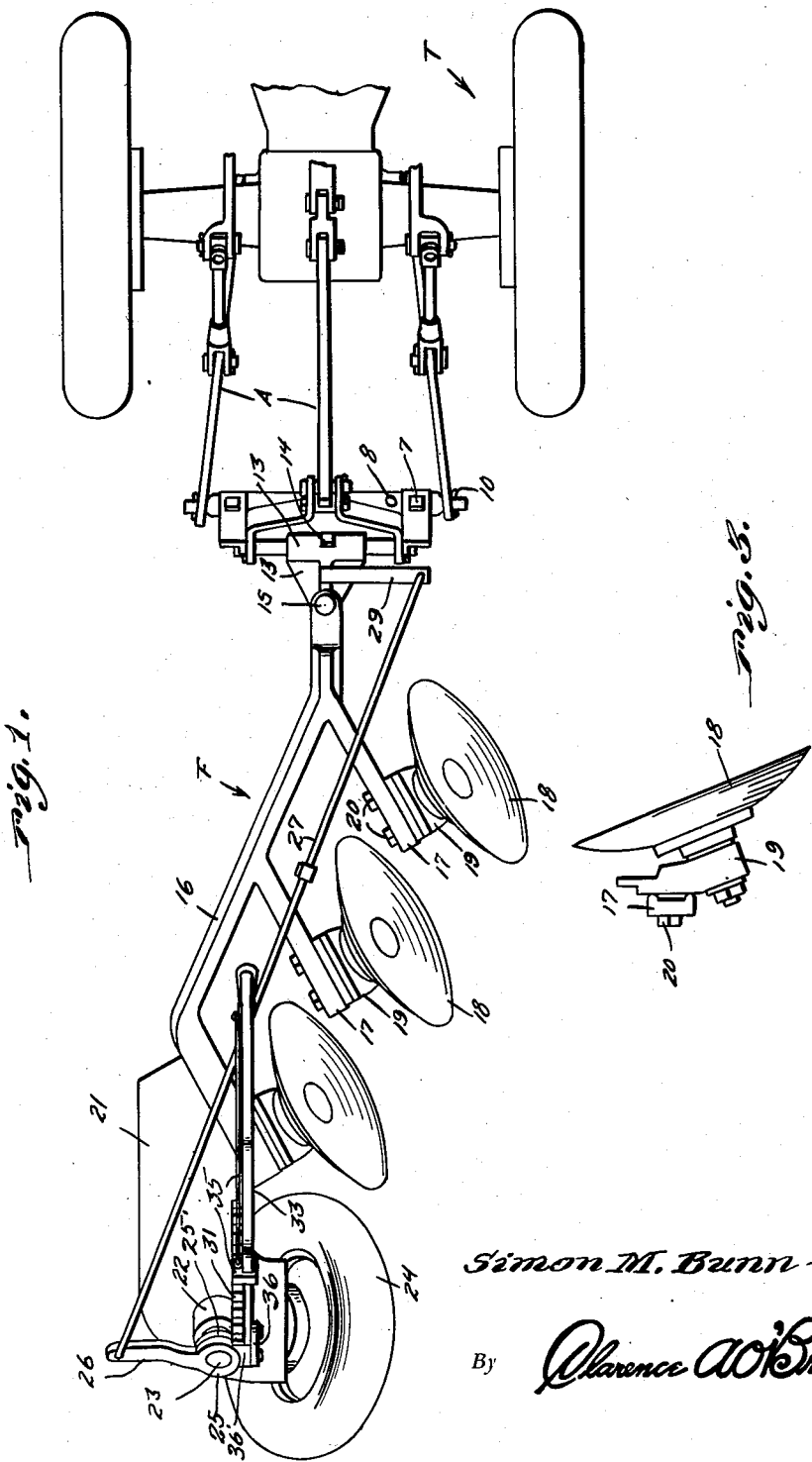
Inventor
Simon M. Bunn
By Clarence A. O'Brien
Attorney

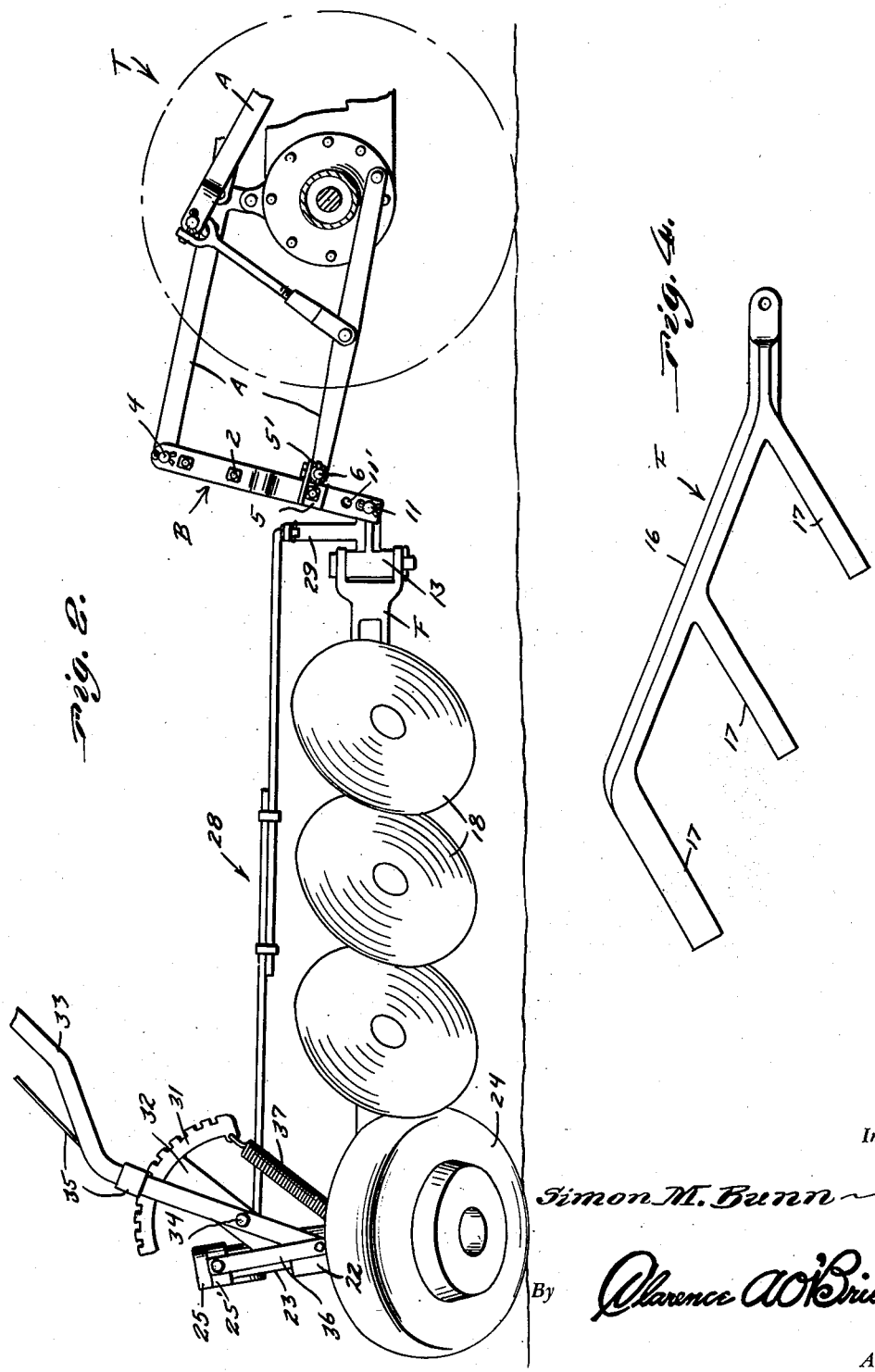

June 22, 1943.  S. M. BUNN  2,322,342
PLOW ATTACHMENT FOR TRACTORS
Filed May 1, 1941  3 Sheets-Sheet 3
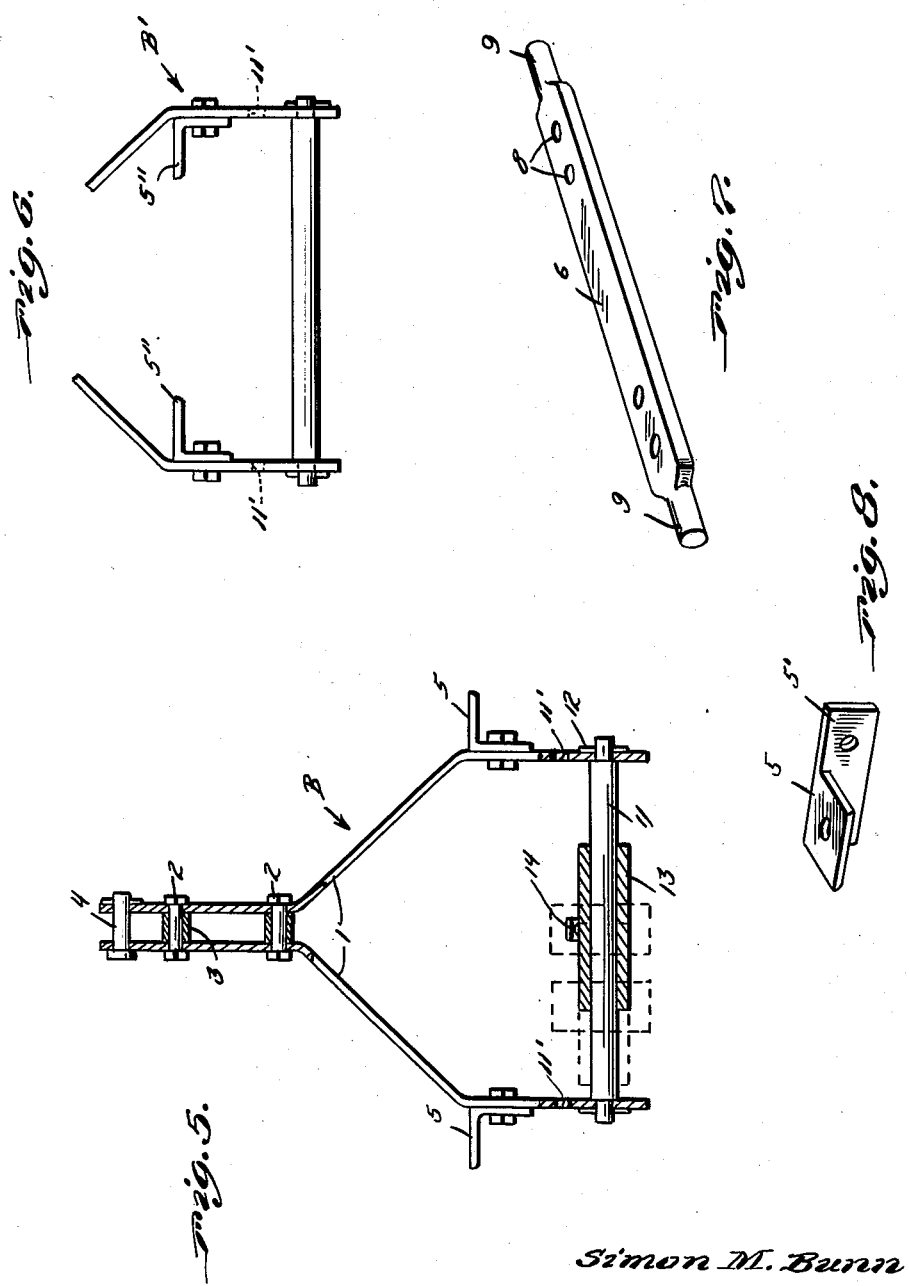
Inventor
Simon M. Bunn
By Clarence A. O'Brien
Attorney Patented June 22, 1943

2,322,342

UNITED STATES PATENT OFFICE 2,322,342

PLOW ATTACHMENT FOR TRACTORS

Simon M. Bunn, Waco, Tex.

Application May 1, 1941, Serial No. 391,423

1 Claim. (Cl. 97—47)

This invention relates to a plow attachment for tractors, the general object of the invention being to provide means whereby the plow carrying frame is pulled by the tractor from a point below the rear axle of the tractor, with means whereby the front of the frame can be raised and lowered, either by the hydraulic means of a tractor equipped with such means or by other means on the tractor, to raise and lower the plows, this movement causing the supporting wheel at the rear of the frame to be moved rearwardly or forwardly.

Another object of the invention is to provide a frame provided with a plurality of arms to the outer end of each of which a plow is connected with means for connecting the rear supporting wheel to the rear arm.

A further object of the invention is to provide a frame connected with a tractor and rotatably carrying a shaft to which a casting is adjustably connected and which, in turn, has the plow carrying frame pivoted thereto.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a top plan view showing the improved plow attachment connected with a tractor which is equipped with hydraulic lift means.

Figure 2 is an elevational view of Figure 1.

Figure 3 is a view showing how a plow is connected to an arm of the frame.

Figure 4 is a top plan view of the frame.

Figure 5 is a view looking toward the frame which is connected with the arms of the hydraulic means of the tractor, part of this frame being shown in section, this view also showing how the casting or clevis is supported on the shaft of the frame.

Figure 6 is a detail view showing a slight part of the casing of the frame shown in Figure 5.

Figure 7 is a view of the tractor draw bar carried by the brackets of the frame shown in Figure 5.

Figure 8 is a view of one of the brackets.

In these views the letter T designates the rear part of a tractor which is provided with the upper central arm, and a lower pair of side arms, each designated A, and which form part of power lift means of well known type, the remaining elements of which have not been shown. In carrying out the invention a frame B is provided of substantially inverted U-shape. This frame is composed of the two bars 1 each of which has a straight upper end, an outwardly extending intermediate part and a depending straight lower end. The straight upper ends of the two bars are connected together by the bolts 2 having the spacers 3 thereon which space the upper ends of the bars 1 apart and a pivot pin 4 passing through holes in the upper ends of the upper portions of the bars 1 and passes through a hole in the upper arm A. A bracket 5 is bolted to the upper end of the lower straight part of each bar 1, said bracket being of angle-shape in cross section and being provided with an extension 5' as shown in Figure 8. A bar 6 engages the extensions 5' of the two brackets and is bolted thereto by the bolts 7 passing through selected ones of the holes 8 in the bar. Instead of fastening the brackets to the outer faces of the bars 1 these brackets can be fastened to the inner faces thereof as shown at 5'' in Figure 6 which shows the frame at B'.

The bar 6 has rounded ends 9 which form pintles for the lower arms A, cotter pins 10 passing through holes in the ends 9 for holding the arms A thereon. Thus the frame B is adjustably connected with the hydraulic means of the tractor so that the frame will adjust itself as the hydraulic means are being raised and lowered to raise and lower the frame.

A shaft 11 has reduced ends passing through holes in the lower ends of the bars 1 with the shaft rotatably held in the frame B such as by the fastening means 12 and a clevis or casting 13 has a tubular part through which the shaft 11 passes so that the clevis or casting can rotate and slide on the shaft. However, the clevis is held in adjusted position on the shaft by means of a set screw 14 though by loosening the set screw the clevis can be adjusted as shown in dotted lines in Figure 5. Of ocurse, when the set screw is tightened then the casting will rock with the shaft 11.

The plow carrying frame F is pivoted to the rear end of the clevis by a vertically arranged pivot pin 15 and this frame has a straight front part through the front end of which the pivot pin 15 passes with the major part of the frame sloping rearwardly and to the left, relatively to the tractor as shown at 16 and this part is provided with a plurality of parallel arms 17, these arms sloping rearwardly and to the right from the part 16. Each arm carries a plow 18, shown in the form of a disk plow and each plow is connected to a supporting member 19 which is fastened to the extremity of an arm 17 by the bolts 20.

A heavy member 21 is connected with the rear arm 17 and at its rear end carries a bearing bushing 22 for the post or spindle 23 of the ground wheel 24, the spindle being bent at an angle at its lower end so as to hold the wheel at an angle in the proper manner and as shown in Figures 1 and 2.

A collar 25 is connected with the upper end of the spindle or post 23 and has an arm 26 attached thereto and a link 27 adjustable as to its length as shown generally at 28, connects the outer end of the arm 26 to an arm 29 of angle shape and connected with the clevis or casting 13, these parts causing the wheel to be given a steering movement automatically as the vehicle is making a turn so as to cause the attachment to accurately follow the tractor in its turning movement.

A toothed quadrant 31 is fastened to a bracket 32 which is connected with the bushing 22 and a hand lever 33 is pivoted to this bracket 32 as shown at 34 with the lever held in adjusted position by the usual detent means, portions of which are shown at 35 and a part of which engages the quadrant. A link 36 connects the lever at the lower end thereof with an arm 36' extending from a collar 25' fast on the spindle or post 23 adjacent the collar 25' so that by adjusting the lever the frame F through means of the member 21 can be raised and lowered to adjust the depth of penetration of the plows 18 in the ground. A spring 37 connects the quadrant with the member 21 and helps the operator to raise the frame when he is manipulating the lever 33.

It will be understood that after the plows 18 have been adjusted by the lever 33 for the proper depth of penetration they can be raised and lowered out of and into the ground by the hydraulic means of the tractor for when such means are raised, for instance, the frame B will be raised and this will raise the front end of the frame F which causes the wheel 24 to advance toward the tractor and thus the plows 18 are lifted from the ground. A reverse movement of the hydraulic means will, of course, lower the frame to permit the plows to enter the ground. During the raising and lowering movement the casting 13 will move with the shaft 11 as the same rotates in the frame. As will be seen the pull of the attachment or plow is below the draw bar which is below the rear axle of the tractor which lends greater tension to the power lift of the tractor and after the parts have been adjusted by the lever 33 the plows can be raised and lowered out of and into the ground by the hydraulic means of the tractor and such hydraulic means is used to regulate the depth of penetration of the plow automatically.

While the drawings show the invention in use with one type of tractor it will be understood that it can be used with other types though preferably with a tractor having a power lift of any kind, or make.

It will be noted that the plow frame or beam is of one piece construction so as to eliminate the use of bolts, nuts and washers to make the plow more rigid.

By adjusting the clevis on the shaft 11, as shown in dotted lines in Figure 5, the width of the cut made by the plow can be increased or decreased as desired. The frame B is provided with a plurality of holes in the lower ends of its limbs so that the shaft 11 can be adjusted in position in said frame by placing its ends in selected ones of the holes 11'. This permits adjustment of the plow for use in soft and hard ground, the shaft being placed in the lower holes when the plow is to be used in soft ground and in the upper holes when plowing extremely hard ground. This provides for plowing at a uniform depth both in hard and soft ground.

Both the wheel 24 and the disks are equipped with ball bearings or other anti-friction means, not shown.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A plow for attachment to a tractor having a central rearwardly extending upper power lift arm, and a pair of similarly extending lower side power lift arms, said arms being vertically swingable, said plow comprising a beam having a straight front end for attachment to said arms, and a major plow carrying portion extending rearwardly and laterally from said end, means to adjustably attach said front end to said arms comprising an upright fork-shaped frame including a pair of opposed side bars having upper closely spaced ends straddling the rear end of the upper power lift arm and pivoted thereto, said frame having widely spaced lower ends, a cross-shaft extending between said lower ends and mounted therein, a clevis on said shaft slidable along the same into different set positions and to which said front end of the beam is pivotally connected for swinging about a vertical axis, a pair of brackets extending forwardly from the lower ends of said frame above said shaft, and a cross-bar bolted to the front ends of said brackets forwardly of said shaft and having end pintles journaled in the rear ends of the lower power lift side arms, respectively.

SIMON M. BUNN.